United States Patent
Björklund

(10) Patent No.: US 9,876,891 B2
(45) Date of Patent: Jan. 23, 2018

(54) METHOD, SYSTEM AND COMPUTER PROGRAM PRODUCT FOR DETERMINING AND PROCESSING A HANDSHAKE USING A WEARABLE DEVICE

(71) Applicant: Sony Corporation, Tokyo (JP)

(72) Inventor: Staffan Björklund, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 231 days.

(21) Appl. No.: 14/384,216

(22) PCT Filed: Apr. 1, 2014

(86) PCT No.: PCT/IB2014/060335
§ 371 (c)(1),
(2) Date: Sep. 10, 2014

(87) PCT Pub. No.: WO2015/150865
PCT Pub. Date: Oct. 8, 2015

(65) Prior Publication Data
US 2016/0241696 A1    Aug. 18, 2016

(51) Int. Cl.
*H04M 1/00* (2006.01)
*H04M 1/725* (2006.01)
*H04M 1/2745* (2006.01)

(52) U.S. Cl.
CPC ... *H04M 1/7253* (2013.01); *H04M 1/274516* (2013.01); *H04M 2250/12* (2013.01)

(58) Field of Classification Search
CPC .................................................. H04W 4/008
USPC ...................................... 455/41.1, 41.2, 41.3
See application file for complete search history.

(56) References Cited

U.S. PATENT DOCUMENTS

| | | | |
|---|---|---|---|
| 8,219,028 B1* | 7/2012 | Flamholz | G06F 1/1694 455/41.2 |
| 2004/0003133 A1* | 1/2004 | Pradhan | H04W 48/08 719/318 |
| 2006/0256074 A1 | 11/2006 | Krum et al. | |
| 2012/0214416 A1* | 8/2012 | Kent | H04L 63/18 455/41.2 |

(Continued)

OTHER PUBLICATIONS

International Search Report and Written Opinion; dated Aug. 6, 2014; issued in International Patent Application No. PCT/IB2014/060335.

(Continued)

*Primary Examiner* — Wen Huang
(74) *Attorney, Agent, or Firm* — James C. Edwards; Moore & Van Allen PLLC

(57) ABSTRACT

The invention is directed to handshake determination. An exemplary method comprises: receiving first handshake information associated with a first device; receiving second handshake information associated with a second device; determining a handshake occurred between a first person associated with the first device and a second person associated with the second device based on the first handshake information and the second handshake information; sharing the first person's contact information with the second person; and sharing the second person's contact information with the first person.

12 Claims, 2 Drawing Sheets

(56) References Cited

U.S. PATENT DOCUMENTS

| | | | | |
|---|---|---|---|---|
| 2012/0278410 A1* | 11/2012 | Chung | .................. | H04W 4/023 |
| | | | | 709/206 |
| 2014/0187160 A1* | 7/2014 | Prencipe | ............... | H04W 4/008 |
| | | | | 455/41.2 |
| 2016/0173169 A1* | 6/2016 | Liu | ......................... | G06F 21/32 |
| | | | | 455/41.1 |

OTHER PUBLICATIONS

International Preliminary Report on Patentability; dated Oct. 13, 2016; issued in International Patent Application No. PCT/IB2014/060335.

* cited by examiner

[Fig. 1]
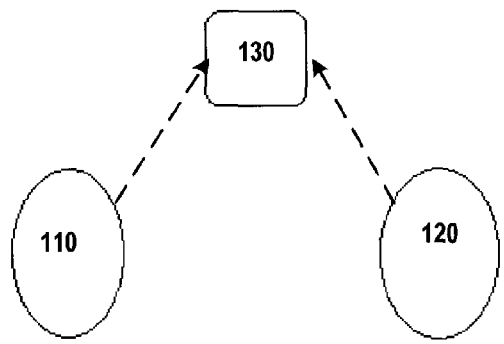
[Fig. 2]
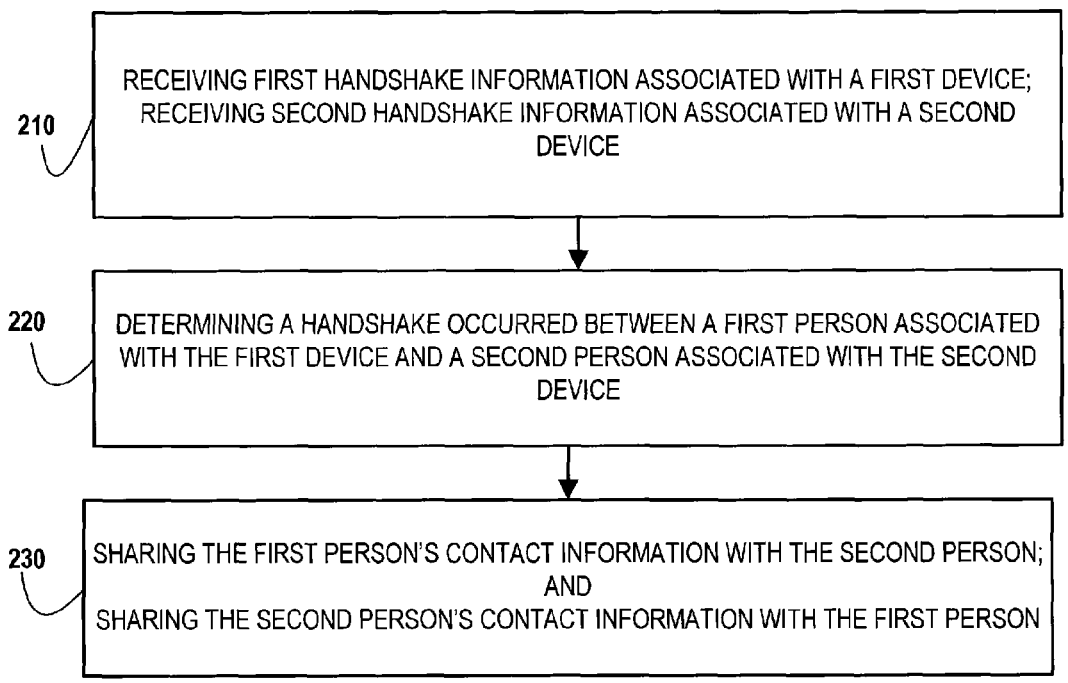

[Fig. 3]
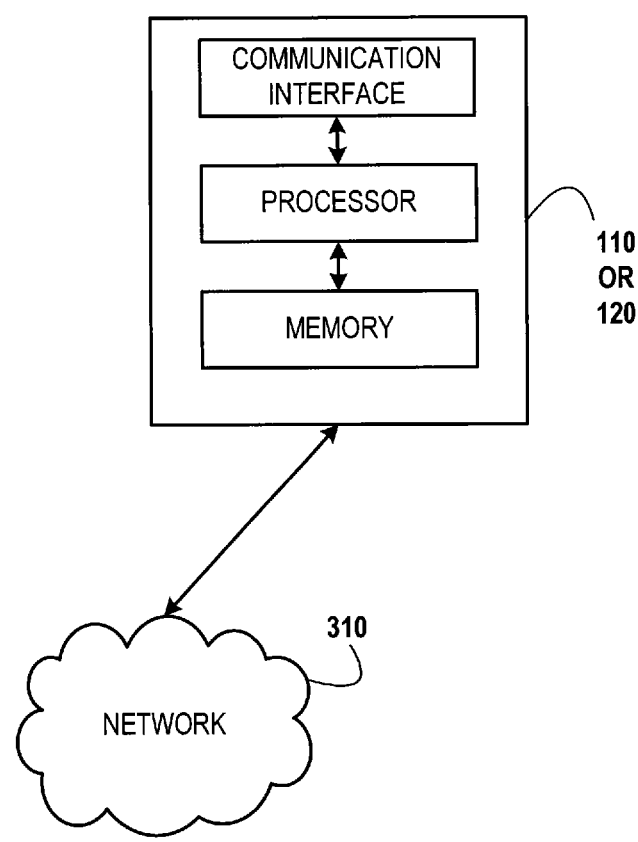

METHOD, SYSTEM AND COMPUTER PROGRAM PRODUCT FOR DETERMINING AND PROCESSING A HANDSHAKE USING A WEARABLE DEVICE

BACKGROUND ART

A person may attend a large gathering and shake hands with several people. There is a need for the person to track the identities of the people who he or she shook hands with.

SUMMARY

Embodiments of the invention are directed to a system, method, and computer program product for determining and processing a handshake. An exemplary method comprises: receiving first handshake information associated with a first device; receiving second handshake information associated with a second device; determining a handshake occurred between a first person associated with the first device and a second person associated with the second device based on the first handshake information and the second handshake information; sharing the first person's contact information with the second person; and sharing the second person's contact information with the first person.

In some embodiments, the first device or the second device comprises a wearable device.

In some embodiments, the first device or the second device comprises a wrist-worn device.

In some embodiments, the method further comprises comparing the first handshake information to the second handshake information.

In some embodiments, the method further comprises determining whether the first handshake information substantially matches the second handshake information.

In some embodiments, the first handshake information comprises at least one of first timestamp information or first location information, and wherein the second handshake information comprises at least one of second timestamp information or second location information.

In some embodiments, the first handshake information is received either directly from the first device or indirectly via another device, and wherein the first handshake information is received either via a long-range or short-range wireless communication mechanism.

In some embodiments, the first person's contact information comprises at least one of a name, a photo, an email address, a phone number, or social networking information associated with the first person.

In some embodiments, sharing the first person's contact information with the second person comprises transmitting the first person's contact information to the second person or making the first person's contact information available to the second person.

In some embodiments, the method further comprises prompting the first person whether the first person wants to share the first person's contact information with the second person.

In some embodiments, the first device comprises at least one of an accelerometer or a gyroscope.

In some embodiments, at least one of a type of or an amount of the first handshake information transmitted from the first device is based on a power level of the first device or a user setting established by the first person.

In some embodiments, the first handshake information is stored in a first cloud-based account associated with the first device, and wherein the second handshake information is stored in a second cloud-based account associated with the second device.

In some embodiments, a system is provided for handshake determination. The system comprises: a memory; a processor; a module stored in the memory, executable by the processor, and configured to: receive first handshake information associated with a first device; receive second handshake information associated with a second device; determine a handshake occurred between a first person associated with the first device and a second person associated with the second device based on the first handshake information and the second handshake information; share the first person's contact information with the second person; and share the second person's contact information with the first person.

In some embodiments, the system comprises a cloud-based server.

In some embodiments, a computer program product is provided for handshake determination. The computer program product comprises a non-transitory computer-readable medium comprising code configured to: receive first handshake information associated with a first device; receive second handshake information associated with a second device; determine a handshake occurred between a first person associated with the first device and a second person associated with the second device based on the first handshake information and the second handshake information; share the first person's contact information with the second person; and share the second person's contact information with the first person.

BRIEF DESCRIPTION OF DRAWINGS

Having thus described embodiments of the invention in general terms, reference will now be made to the accompanying drawings, where:

FIG. 1 presents an exemplary block diagram for handshake determination, in accordance with embodiments of the present invention;

FIG. 2 presents an exemplary process flow for handshake determination, in accordance with embodiments of the present invention; and FIG. 3 presents an exemplary network environment for handshake determination, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to a wearable electronic device. The wearable device may be a watch or a wrist band. Therefore, the wearable device may be described as a "wrist-worn" device. As used herein, a "device" refers to wearable device which may be a wrist-worn device. The device may comprise one or more sensors to detect characteristics of the movement of the device (e.g., amount of movement, direction of movement, speed and/or acceleration of movement, etc.). Exemplary sensors include an accelerometer, a gyroscope, etc. As used herein, a gyroscope uses the Earth's gravity to enable determination of the device's orientation. As used herein, an accelerometer measures non-gravitational acceleration of the device. Additionally, the device comprises a fast processor (e.g., equal to or greater than a threshold speed) and an accurate clock (e.g., equal to or greater than a threshold accuracy). Additionally, the device comprises one or more communication interfaces that enable wireless communication (short-range and/or long-range communication) with other devices (e.g., mobile device, personal computer, cloud server, etc.). Exemplary wireless communication mechanisms include Bluetooth, Bluetooth Low Energy (BLE), Wireless Fidelity (WiFi), radio frequency (RF), etc. This invention is not limited to any particular wireless communication mechanisms. The device may be associated with an application that is accessible via the wearer's mobile device or computer. Optionally, the device may also comprise a module that enables determination of the location of the device. In some embodiments, a device or wrist-worn device as described herein may refer to a wearable electronic device that may be worn on any part of a person's body (not limited to the wrist).

The present invention is directed to a wearable device that determines a handshake between two persons. Determining the handshake comprises determining the motion, timing (e.g., a timestamp), and other characteristics associated with the handshake. Additionally, the present invention enables connecting the persons associated with the handshake on a cloud (e.g., a social networking cloud), thereby enabling information sharing between the persons.

Assume a first person wearing a first device (e.g., a first wrist-worn device) meets a second person wearing a second device (e.g., a second wrist-worn device). The first device transmits information associated with the handshake to a server. The second device also transmits information associated with the handshake to a server (either the same server in communication with the first device or a different server). Each of the devices may communicate with the server via a short-range or long-range wireless communication mechanism. In some embodiments, the information is directly transmitted from each device to the server. In other embodiments, the information is first transmitted to a close-range device (e.g., a mobile phone, tablet or other computer, headgear, eyewear, etc.) via a short-range wireless communication mechanism (e.g., Bluetooth, BLE, WiFi, etc.), and then the close-range device transmits the information to a server via a long-range (e.g., RF) wireless communication mechanism. Information associated with the handshake is logged in the application associated with each user's cloud-based account that is associated with each user's device.

Based on the timestamp of the handshake as logged, recorded, or stored in the first user's and the second user's cloud-based accounts, the server determines that the first person shook hands with the second person at a time associated with the timestamp. For example, if the timestamp information associated with the handshake as received from the first device substantially matches the timestamp information associated with the handshake as received from the second device, the server may also compare location information received from each device to determine whether the person associated with the first device shook hands with the person associated with the second device. If there is a substantial match between the timestamp information received from each device and/or there is a substantial match between the location information received from each device, the server determines that a handshake occurred between a person associated with the first device and a person associated with the second device.

If a handshake is determined by the server, based on the setting associated with each person's account, each person's name, contact information (e.g., phone number, email address, social network information, etc.), and photo is shared with (e.g., transmitted to, made accessible or visible to, etc.) the other person. For example, the first person's contact information is transmitted to the second user's email address or second user's mobile device via a text or multimedia message. As a further example, the first person's contact information is made visible to the second person such that when the second user accesses the second user's application associated with the device (or accesses the second user's social network), the first person's contact information is made visible to the second person. In some embodiments, the server prompts a user for permission before sharing the user's contact information with the other person. Therefore, the present invention enables a first person to know more about people that the first person shook hands with. This is useful especially if the first person, on a certain day at a certain event, shook hands with several hundreds of people.

In some embodiments, each device also transmits to the server information associated with the location of the handshake. For example, the device transmits to the server: Global Positioning System (GPS) coordinates recorded before, at, or after the timestamp of the handshake, proximity to base station readings recorded before, at, or after the timestamp of the handshake, Internet Protocol (IP) address information recorded before, at, or after the timestamp of the handshake, etc. GPS information is recorded and transmitted in a high-power device (e.g., when the power level of the device is equal to or greater than a threshold power level). In a low-power device (e.g., when the power level of the device is less than a threshold power level), either no location information is transmitted to the server or proximity to base station readings and/or IP address information is transmitted to the server. Therefore, in some embodiments, the type of information transmitted to the server is based on a power level of the device. In other embodiments, even the amount of information transmitted to the server is based on a power level of the device. For example, an amount of information equal to or greater than a threshold amount is transmitted in a high-power device, and an amount of information less than the threshold amount is transmitted in a low-power device. In still other embodiments, the amount of and/or type of information transmitted to the server is based on a user setting.

Referring now to FIG. 1, FIG. 1 describes an exemplary block diagram for determining and processing a handshake. A first person wearing wrist-worn device 110 shakes hands with a second person wearing wrist-worn device 120. The detection or determination of the handshake triggers both the first device 110 and the second device 120 to transmit information associated with the handshake to a server 130. The information transmitted from the first device 110 to the server 130 may be the same as or different from the information transmitted from the second device 120 the server 130. For example, the information transmitted from the first device 110 to the server 130 may comprise timestamp information but no location information, while the information transmitted from the second device 120 to the server 130 comprises timestamp information and location information. As described previously, the type of information transmitted from a device to the server may depend on a user setting and/or a power level of the device. If the power level of the device is equal to or greater than a threshold power level, the device transmits timestamp information and GPS information. If the power level of the device is less than the threshold power level, the device transmits timestamp information, but no GPS information. However, in such a low-power mode when the power level of the device is less than the threshold power level, the device may sometimes send other location information such as proximity to base station readings and/or IP address information to the server 130.

Referring now to FIG. 2, FIG. 2 illustrates an exemplary process flow for determining and processing a handshake. The process flow may be performed by server such as a cloud-based server or any other devices or systems described herein. At step 210, the process flow comprises receiving first handshake information (e.g., timestamp information, location information, etc.) associated with a first device (e.g., a wearable device such as a wrist-worn device), and receiving second handshake information (e.g., timestamp information, location information, etc.) associated with a second device (e.g., a wearable device such as a wrist-worn device). In some embodiments, the handshake information from either device is received either directly from the device or indirectly via another device. Additionally, the handshake information from either device is received either via a long-range or short-range wireless communication mechanism. In some embodiments, the first device or the second device comprises at least one of an accelerometer or a gyroscope. In some embodiments, at least one of a type of or an amount of the handshake information transmitted from a device to the server is based on a power level of the device or a user setting established by the person associated with the device. In some embodiments, the first handshake information is stored in a first cloud-based account associated with the first device, and the second handshake information is stored in a second cloud-based account associated with the second device.

At step 220, the process flow comprises determining a handshake occurred between a first person associated with the first device and a second person associated with the second device based on the first handshake information and the second handshake information. The determination of a handshake is based on comparing the first handshake information to the second handshake information, and determining the first handshake information substantially matches the second handshake information.

At step 230, the process flow comprises sharing the first person's contact information with the second person, and sharing the second person's contact information with the first person. Contact information associated with either person comprises at least one of a name, a photo, an email address, a phone number, or social networking information associated with the person. Sharing either person's contact information with the other person comprises transmitting the person's contact information to the other person or making the person's contact information available for viewing to the other person. In some embodiments, the process flow further comprises prompting the person associated with a device (e.g., the first device) whether the person wants to share the person's contact information with the other person.

Referring now to FIG. 3, FIG. 3 presents an exemplary block diagram of the network environment for determining and processing a handshake, in accordance with embodiments of the present invention. As illustrated, the network environment includes a network 310 and a device 110 or 120. As shown in FIG. 3, the device 110 or 120 is operatively and selectively connected (e.g., via one or more wireless mechanisms) either directly to the network 310 or indirectly to the network 310 via one or more other computing devices, wherein the network may include one or more separate networks. Network 310 may enable the device 110 or 120 to transmit information to and/or receive information from the server 130 in FIG. 1.

The device 110 or 120 is a computing device that comprises a communication interface, a processor, a memory, and a module stored in the memory, executable by the processor, and configured to perform the various processes described herein. Each communication interface described herein enables communication with other systems via the network 310.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:
1. A method for handshake determination, the method comprising:
in response to a first wearable device determining motion associated with a first handshake, receiving first handshake information associated with the first wearable device, wherein the first handshake information includes at least a first timestamp of the first handshake;
in response to a second wearable device determining motion associated with a second handshake, receiving second handshake information associated with the second wearable device, wherein the second handshake information includes at least a second timestamp of the second handshake, and wherein a type of or an amount of at least one of the first handshake information and the second handshake information is based on a power level of a corresponding one of the first wearable device or second wearable device;
determining a handshake occurred between a first person associated with the first wearable device and a second person associated with the second wearable device by comparing the first handshake information to the second handshake information and determining, at least, that the first timestamp substantially matches the second timestamp; and in response to determining that the handshake has occurred, sharing at least one of the first person's contact information with the second person and the second person's contact information with the first person.

2. The method of claim 1, wherein the first wearable device or the second wearable device comprises a wrist-worn device.

3. The method of claim 1, wherein the first handshake information further comprises first location information, and wherein the second handshake information further comprises second location information.

4. The method of claim 1, wherein at least one of the first handshake information and the second handshake information is received either directly from the first wearable device or indirectly via another device, and wherein at least one of the first handshake information and the second handshake information is received either via a long-range or short-range wireless communication mechanism.

5. The method of claim 1, wherein at least one of the first person's contact information and the second person's contact information comprises at least one of a name, a photo, an email address, a phone number, or social networking information associated with a corresponding one of the first person or the second person.

6. The method of claim 1, wherein sharing the first person's contact information with the second person and sharing the second person's contact information with the first person comprises (i) transmitting the first person's contact information to the second person or making the first person's contact information available to the second person, and (ii) transmitting the second person's contact information to the first person or making the second person's contact information available to the first person.

7. The method of claim 1, further comprising prompting at least one of the first person whether the first person wants to share the first person's contact information with the second person, and the second person whether the second person wants to share the second person's contact information with the first person.

8. The method of claim 1, wherein the first wearable device and the second wearable device comprise at least one of an accelerometer or a gyroscope.

9. The method of claim 1, wherein the first handshake information is stored in a first cloud-based account associated with the first wearable device, and wherein the second handshake information is stored in a second cloud-based account associated with the second wearable device.

10. A system for handshake determination, the system comprising:
    a memory;
    a processor; and
    a module stored in the memory, executable by the processor, and configured to:
        in response to a first wearable device determining motion associated with a first handshake, receive first handshake information associated with the first wearable device, wherein the first handshake information includes at least a first timestamp of the first handshake;
        in response to a second wearable device determining motion associated with a second handshake, receive second handshake information associated with the second wearable device, wherein the second handshake information includes at least a second timestamp of the second handshake, and wherein a type of or an amount of at least one of the first handshake information and the second handshake information is based on a power level of a corresponding one of the first wearable device or second wearable device;
        determine a handshake occurred between a first person associated with the first wearable device and a second person associated with the second wearable device by comparing the first handshake information to the second handshake information and determining, at least, that the first timestamp substantially matches the second timestamp; and
        in response to determining that the handshake has occurred, share at least one of the first person's contact information with the second person and the second person's contact information with the first person.

11. The system of claim 10, wherein the system comprises a cloud-based server.

12. A computer program product for handshake determination, the computer program product comprising a non-transitory computer-readable medium comprising code configured to:
    in response to a first wearable device determining motion associated with a first handshake, receive first handshake information associated with the first wearable device, wherein the first handshake information includes at least a first timestamp of the first handshake;
    in response to a second wearable device determining motion associated with a second handshake, receive second handshake information associated with the second wearable device, wherein the second handshake information includes at least a second timestamp of the second handshake, and wherein a type of or an amount of at least one of the first handshake information and the second handshake information is based on a power level of a corresponding one of the first wearable device or second wearable device;
    determine a handshake occurred between a first person associated with the first wearable device and a second person associated with the second wearable device by comparing the first handshake information to the second handshake information and determining, at least, that the first timestamp substantially matches the second timestamp; and
    in response to determining that the handshake has occurred, share at least one of the first person's contact information with the second person and the second person's contact information with the first person.

* * * * *